United States Patent
Jain et al.

(10) Patent No.: US 10,169,174 B2
(45) Date of Patent: Jan. 1, 2019

(54) DISASTER RECOVERY AS A SERVICE USING VIRTUALIZATION TECHNIQUE

(71) Applicant: International Business Machines Corporation, Armonk, NY (US)

(72) Inventors: Rakesh Jain, San Jose, CA (US); Ramani R. Routray, San Jose, CA (US); Yang Song, San Jose, CA (US); Mu Qiao, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/056,489

(22) Filed: Feb. 29, 2016

(65) Prior Publication Data

US 2017/0249221 A1 Aug. 31, 2017

(51) Int. Cl.
*G06F 11/00* (2006.01)
*G06F 11/20* (2006.01)

(52) U.S. Cl.
CPC ...... *G06F 11/203* (2013.01); *G06F 2201/805* (2013.01); *G06F 2201/815* (2013.01)

(58) Field of Classification Search
CPC ............. G06F 11/1451; G06F 11/1461; G06F 11/1464; G06F 11/1466; G06F 11/169; G06F 11/1484
See application file for complete search history.

(56) References Cited

U.S. PATENT DOCUMENTS

| | | | |
|---|---|---|---|
| 7,725,441 B2 | 5/2010 | Balasubramanian et al. | |
| 7,788,234 B2 | 8/2010 | DePue et al. | |
| 8,204,863 B2 | 6/2012 | Sawdon et al. | |
| 8,527,990 B1 * | 9/2013 | Marathe | G06F 9/45558 718/1 |
| 8,856,591 B2 | 10/2014 | Wang | |
| 8,924,773 B1 | 12/2014 | Veeraswamy | |
| 9,063,822 B2 | 6/2015 | Valiyaparambil et al. | |
| 9,274,903 B1 * | 3/2016 | Garlapati | G06F 11/2002 |
| 2003/0079156 A1 * | 4/2003 | Sicola | G06F 11/0727 714/4.1 |

(Continued)

OTHER PUBLICATIONS

Liu, "Live Migration of Virtual Machine Based on Recovering System and CPU Scheduling", 2011, IEEE, p. 1-5 (Year: 2011).*

(Continued)

*Primary Examiner* — Bryce P Bonzo
*Assistant Examiner* — Jeison C Arcos
(74) *Attorney, Agent, or Firm* — Lieberman & Brandsdorfer, LLC (57) ABSTRACT

Embodiments of the invention relate to recovering from a disaster associated with an information technology environment. An information technology environment is replicated to a service provider. A recovery plan is generated for the environment. The recovery plan includes two processes. In response to the service provider receiving a disaster recovery request associated with the environment, the service provider executes a disaster recovery protocol. The protocol includes simultaneously executes the first and second processes. The first process operates a workload in the form of one or more containers, and the second process is a background process that creates a replica of the environment. After completion of the replica creation, the workload is migrated to the replica.

17 Claims, 5 Drawing Sheets

(56) References Cited

U.S. PATENT DOCUMENTS

| | | | | |
|---|---|---|---|---|
| 2003/0221074 A1* | 11/2003 | Satoyama | ............. | G06F 3/0605 |
| | | | | 711/162 |
| 2005/0198303 A1* | 9/2005 | Knauerhase | .......... | G06F 9/5055 |
| | | | | 709/227 |
| 2006/0041789 A1* | 2/2006 | Cochran | ............. | G06F 11/1469 |
| | | | | 714/37 |
| 2009/0037554 A1* | 2/2009 | Herington | ............. | G06F 9/4856 |
| | | | | 709/213 |
| 2010/0115332 A1 | 5/2010 | Zheng et al. | | |
| 2011/0022879 A1* | 1/2011 | Chavda | ............... | G06F 11/0793 |
| | | | | 714/1 |
| 2012/0030513 A1* | 2/2012 | Peng | .................. | G06F 11/2097 |
| | | | | 714/37 |
| 2012/0151061 A1* | 6/2012 | Bartfai-Walcott | .... | G06F 9/4856 |
| | | | | 709/226 |
| 2013/0007506 A1* | 1/2013 | Jain | ..................... | G06F 11/1484 |
| | | | | 714/4.12 |
| 2013/0185716 A1* | 7/2013 | Yin | ..................... | G06F 9/45558 |
| | | | | 718/1 |
| 2014/0040206 A1 | 2/2014 | Ramakrishnan et al. | | |
| 2015/0363282 A1* | 12/2015 | Rangasamy | ........ | G06F 11/2033 |
| | | | | 714/4.12 |

OTHER PUBLICATIONS

Jin, "Live Virtual Machine Migration with Adaptive Memory Compression", 2009, IEEE, p. 1-10 (Year: 2009).*

* cited by examiner

DISASTER RECOVERY AS A SERVICE USING VIRTUALIZATION TECHNIQUE

BACKGROUND

The present invention relates to disaster recovery as a shared resource service. More specifically, the invention relates to employing at least two separate but parallel processes for supporting disaster recovery.

Disaster recovery as a service (DRaaS) is the replication and hosting of physical or virtual services by a thirty party to provide failover in the event of some form of a catastrophe. Typically, DRaaS requirements and expectations are document in a service level agreement (SLA), and the third party vendor provides failover to a cloud computing environment. Aspects of the SLA generally identify disaster recovery time and recovery point objectives. More specifically, the recovery time objective is the maximum tolerable length of time that a computer, system, network, or application can be down after a failure or disaster occurs. The recovery time objective is a function of the extent to which the interruption disrupts normal operations and the amount of revenue lost per unit time as a result of the disaster. The recovery time objective is an important consideration in disaster recovery planning. The recovery point object is the age of files that must be recovered from backup storage for normal operations to resume if a computer, system, or network goes down as a result of a hardware, program, or communications failure. Once the recovery point objective for a given computer, system, or network has been defined, it determines the minimum frequency with which backups must be made. Accordingly, the recovery time and recovery point objective assist with selection of optimal disaster recovery technologies and procedures.

When a disaster recovery is issued or declared, the DRaaS provider launches an exact copy of the client information technology environment per the terms identified in the SLA. More specifically, the recovery is a replication of the identified virtual machine and virtual disk configurations.

SUMMARY

The aspects described herein include a method, a system, and a computer program product for recovering from a disaster associated with an information technology environment.

According to one aspect, a method is provided for recovering from a disaster associated with an information technology environment. The method includes receiving a replication of an information technology environment. A recovery plan is generated for the environment. The recovery plan includes a first process and a second process. In response to receiving a disaster recovery request associated with the environment, a disaster recovery protocol is executed. The protocol includes simultaneously executing the first and second processes. The first process operates a workload associated with core applications, and the second process is a background process that creates a replica of the environment. After completion of the replica, the workload is migrated from the core workload associated with the first process to the replica created by the second process.

According to another aspect, a computer program product is provided to recover from a disaster associated with an information technology environment. The computer program product includes a computer-readable storage medium having program code embodied therewith. The program code is executable by a processing unit to receive a replication of an information technology environment. A recovery plan is generated for the environment. The recovery plan includes a first process and a second process. In response to receiving a disaster recovery request associated with the environment, a disaster recovery protocol is executed. The protocol includes simultaneously executing the first process and a second process. The first process operates a workload, and the second process is a background process that creates a replica of the environment. After completion of the replica, the workload is migrated to the replica.

According to yet another aspect, a system is provided to recover from a disaster associated with an information technology environment. The system includes processing unit operatively coupled to memory and one or more tools in communication with the processing unit. The tool receives a replication of an information technology environment. A recovery plan is generated for the environment. The recovery plan includes first and second processes. In response to receipt of a disaster recovery request associated with the environment, a disaster recovery protocol is executed. The protocol simultaneously executes the first process and the second process. The first process operates a workload, and the second process is a background process that creates a replica of the environment. After completion of the replica, the workload is migrated to the replica.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

The disaster recovery employs two sub-processes, including a background process and a foreground process. In one embodiment, the background and foreground processes take place simultaneously. The background process is configured to create a replica of an information technology (IT) environment associated with a client. In one embodiment, the background process includes replication of the client virtual machine(s) and virtual disk configurations as defined by recovery point objectives. The foreground process employs lightweight virtualization techniques to operate a workload of the client until such time as the background process concludes and the completed replica is available to support the workload. In one embodiment, operating the workload includes handling client-critical applications to support functionality and any critical IT requests.

The lightweight virtualization techniques employed by the foreground process may include creating one or more lightweight virtualization resources. In one embodiment, each lightweight virtualization resource is referred to as a container, and the foreground process creates a container-based environment comprising one or more containers to operate the workload while the background process is creating the replica. Container-based virtualization, also referred to herein as an operating system (OS) virtualization, is an approach to virtualization in which a virtualization layer runs as an application within the OS. The OS kernel runs on a hardware node with isolated guest virtual machines installed on the kernel. Each isolated guest is referred to as a container. The container-based virtualization mitigates overhead associated within each guest running a completely installed operating system. In one embodiment, one or more containers are provided to users as a service ("containers-as-a-service" or "CaaS") from a cloud service provider. Specifically, the CaaS may include tools and resources for a user to upload, organize, run, call, manage, and stop containers using a service provider's application program interface call or web portal interface. Accordingly, the container based virtualization employs one operating system to manage multiple hardware calls.

Although the container-based environment is not equivalent in function or composition to the original IT environment, the container-based environment may be created to selectively serve one or more critical applications in the client environment. For example, a web service in the container may show that a client site is in maintenance, or may provide one or more links to an alternative web site while the client site is not operational.

Figure 1:
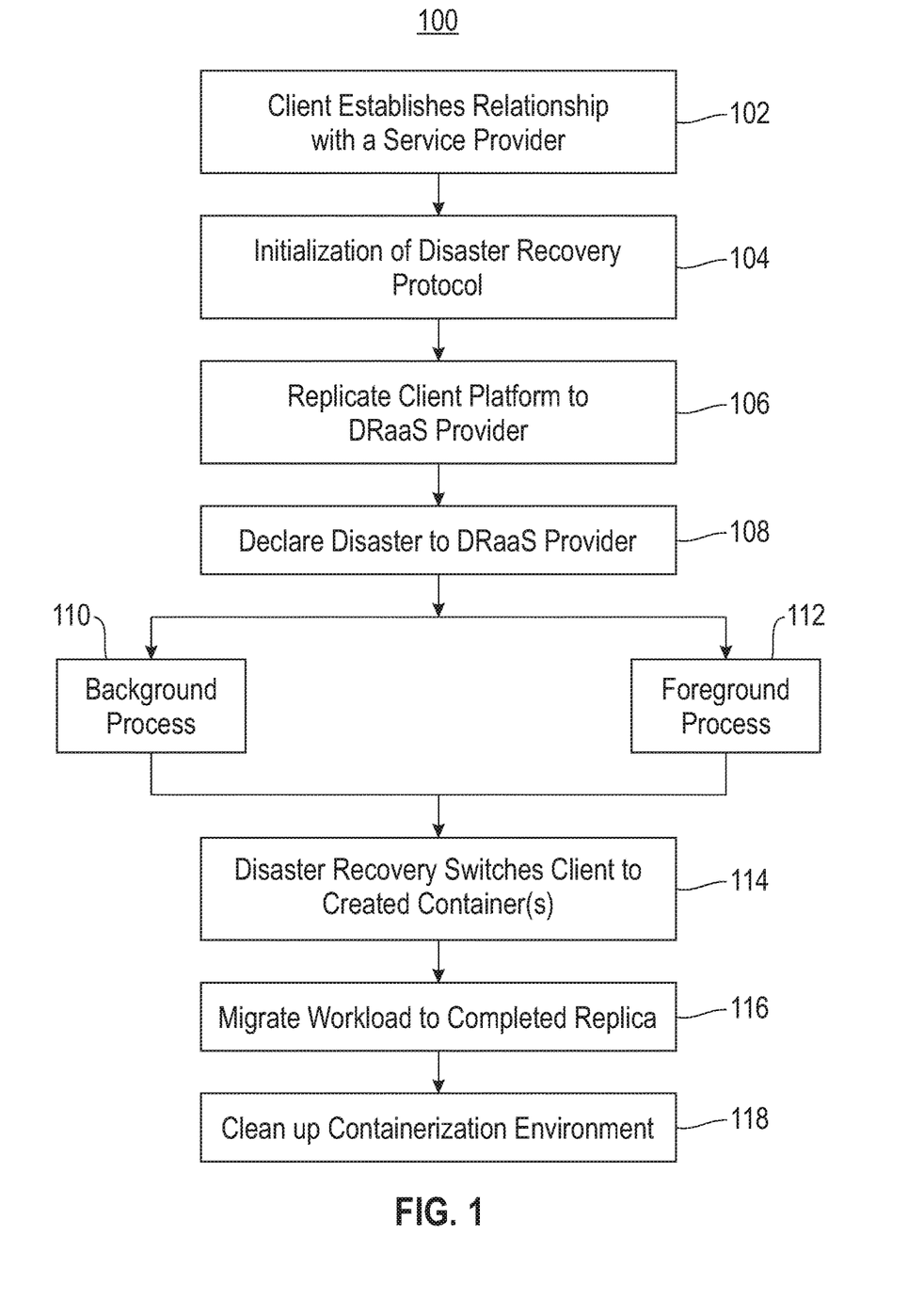
FIG. 1 depicts a flow chart illustrating a process of configuring and employing an efficient disaster recovery protocol.

Referring to FIG. 1, a flow chart (100) is provided illustrating a process of configuring and employing an efficient disaster recovery protocol. As shown, the first part of the process pertains to setting up the client's information technology (IT) environment. More specifically, the client contracts with or otherwise establishes a relationship with a service provider, such as a disaster recovery as a service (DRaaS) provider (102). Based on the terms of the relationship, a disaster recovery protocol initialization takes place (104). The initialization includes assessing an internal structure of the IT environment, such as the quantity of virtual machines and how they are connected. In one embodiment, the client provides the structural information directly to the DRaaS provider, and in another embodiment, the DRaaS provider may employ a discovery agent, or tool, to gather and assess the structural information. The disaster recovery protocol initialization includes identifying one or more core application of the client. Two recovery plans are generated, including a fast recovery plan which employs containers, and background process which employs recovery of the virtual machines associated with the client IT environment. The recovery plans are both generated based on the identified core applications. In one embodiment, generating the fast recovery plan includes identifying core application processes associated with the environment that need to be handled during the disaster recovery protocol, as will be described in detail below. Generating the fast recovery plan may include creating containerization and container launching plans for one or more containers corresponding to one or more core application processes.

For example, a client setup discovery may show a website service with two virtual machines. One of the virtual machines is configured for a Linux operating system with a web server ("web application"), and the other virtual machine is configured for a Windows operating system with a database server ("database application"). This configuration information can be provided by the client or obtained by the discovery agent or tool of the service provider. The DRaaS will use the configuration information provided by the client to calculate the fast recovery plan for use during disaster recovery. For example, in one embodiment, the client may direct the DRaaS that the web application and the database application are core applications, such that in the event of a disaster, the DRaaS will containerize the web and database applications to serve requests to these applications (i.e., to operate a workload). For example, the client may tell the DRaaS to containerize the web server to quickly start a web service in the corresponding container (e.g. by showing a site maintenance message), and may optionally containerize the database server. Accordingly, the foreground aspect of a disaster recovery protocol is either directly or indirectly dictated by the needs of the client to a service provider, e.g. DRaaS.

The fast recovery plan is established during setup and initialization. However, as the client platform remains functional and active, the structure and associated data of the environment may be subject to change. To ensure that the disaster recovery plan is up-to-date and properly maintained, the client platform is continuously or periodically replicated to the DRaaS provider (106). This replication pertains to changes to both configuration and data.

At such time as a disaster is discovered or declared to the DRaaS provider (108), two processes are simultaneously launched, including a background process (110) and a foreground process (112). The background process (110) creates a full replica of the client IT environment, which in one embodiment may be an exact copy of the virtual machine(s). The foreground process (112) operates the workload of the selected core applications, which in one embodiment includes creating and launching one or more containers of the containerization and container launching plans to serve future client traffic until such time as the background process is complete.

The background and foreground processes (110) and (112) are simultaneously launched so that the disaster is not visible, or if in one embodiment it is or becomes visible, the visibility of the disaster is substantially negligible. In one embodiment, the container launched in the foreground is a temporary service and does not support the complete functionality of the client. For example, in one embodiment, the launched container may be limited in application support, and may communicate a site maintenance message, link to an alternate website, or in one embodiment, may support a limited set of actions, such as client critical applications. Accordingly, the launched container provides limited support to core applications of the client IT environment.

Creation of the container(s) by the foreground process is significantly less than the replica virtual machine environment by the background process. As such, the disaster recovery switches the client to the container(s) created by the foreground process, while the background process continues the virtual machine replication (114). At such time as the background process is completed and the replica is operational, the workload is migrated or switched from the container(s) in the foreground to the virtual machine environment in the background (116). In one embodiment, the switch takes place based on a set of predetermined recovery policies, which in one embodiment are customizable policies. For example, in one embodiment, the set of recovery policies may require that a fixed period of time is allowed to lapse upon completion of the background process before the switch takes place. In one embodiment, after the migration of the workload, the containerization environment is cleaned up or otherwise removed (118). Accordingly, the foreground process is a temporary environment to support the client in a limited capacity until such time as the background process is completed and as such the transfer between the processes is completed.

There is a significant time differential associated with recovery of a container virtualization and the virtual machine environment. Specifically, the creation time of a lightweight virtualization resource, such as a container, is about 50 ms. A virtual machine boot up time is greater, and in one embodiment, requires about 100 seconds or more. Accordingly, launching the container virtualization as a form of a disaster recovery that allows for fast temporary recovery of critical functions, as compared with a virtual machine re-boot.

Figure 2:
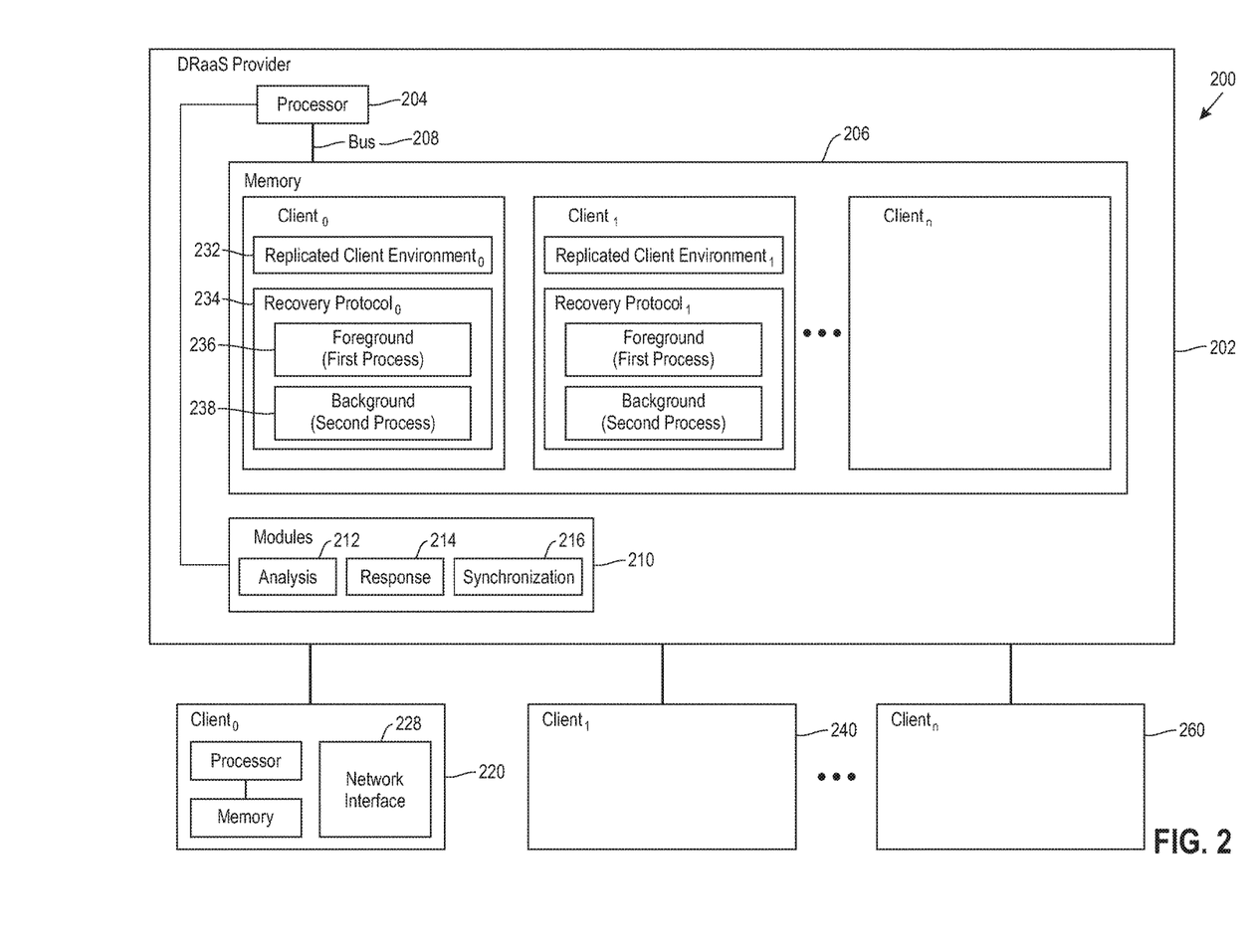
FIG. 2 depicts a block diagram illustrating system components in support of disaster recovery.

Referring to FIG. 2, a block diagram (200) is provided illustrating system components in support of disaster recovery. A Disaster Recovery-as-a-Service (DRaaS) provider (202) is shown in communication with clients (220), (240), and (260). Although three clients (220), (240), and (260) are shown and described, this quantity should not be considered limiting. In one embodiment, the quantity of clients in communication with the provider (202) may be greater than or less than the quantity shown and described herein. The DRaaS provider (202) is shown with a hardware processing unit, such as processor (204), in communication with memory (206) across a bus (208). The DRaaS provider (202) is shown with modules (210) in support of disaster recovery. As shown, the modules include an environmental analysis module (212), referred to herein as an analysis module, a fast response module (214), referred to herein as a response module, and a synchronization module (216). In the example shown herein, the modules (210) are located local to the DRaaS provider (202), although the location should not be considered limiting. For example, in one embodiment, one or more of the modules may be located remotely from the DRaaS provider (202), such as another provider in communication with the DRaaS provider (202). Accordingly, the modules in support of disaster recovery may be hosted local to a single DRaaS provider, or distributed among two or more DRaaS providers.

Three clients, (220), (240), and (260) are shown in communication with the DRaaS provider (202), although this quantity should not be considered limiting. For descriptive purposes, the functionality of the disaster support will be described with respect to client (220), and may be extended to each and any of the clients (240) and (260). The client (220) is shown herein configured with a network interface (228) to support communication with the DRaaS provider (202), and in one embodiment may support communication with multiple DRaaS providers. The client (220) is associated with a corresponding information technology (IT) environment. In one embodiment, the IT environment includes two or more virtual machines. As is known in the art, a virtual machine is an emulation of a computer system, and is backed by the physical resources of the host (e.g., client (220)). Each virtual machine may be comprised of a set of specification and configuration files.

As shown and described in FIG. 1, in support of disaster recovery the client (220) establishes a relationship with the DRaaS provider (202), which includes replication of the client IT environment (232) of client (220) to the DRaaS provider (202). The environment analysis module (212) functions to analyze the client IT environment and to produce a recovery protocol (234). As shown herein, the recovery protocol (234) is specific to $Client_0$ (220). In one embodiment, each client that is supported by the DRaaS provider (202) will have its own recovery protocol stored in memory (206). As shown herein, the recovery protocol (234) includes a foreground recovery plan (236) for supporting a client application workload that is determined to be core or critical (e.g., by containerization), and a background recovery plan (238) for replicating the client IT environment. As such, the recovery protocol is essentially bifurcated in foreground and background processes (236) and (238), respectively, with the foreground process (236) directed at containerization and the background process (238) directed at virtual machine replication and recovery. Further, the recovery plans (236) and (238) are generated locally with respect to the DRaaS provider (202), e.g. remote from the client (220), and are stored in the DRaaS provider memory (206).

As shown and described in FIG. 1, detection of a disaster of a client, such as $client_0$ (220), will activate both recovery plans, with the foreground recovery plan (236) functioning as a foreground process and the background recovery plan (238) as a background process. In one embodiment, both recovery plans are activated simultaneously or near-simultaneously. Similarly, in one embodiment, the activation of the background recovery plan (238) is a background process that replicates the virtual machine environment subject to the disaster. The effective rebuilding of the client virtual machine environment is not otherwise visible or available until the background plan has completed the rebuild, which is then provided to the DRaaS provider (202).

The client IT environment may be static or dynamic. In the case of a static environment, the environment analysis module (212) performs the client site evaluation and creates the recovery plans (236) and (238). However, in the case of a dynamic environment, also referred to herein as an environment subject to change that expands or contracts over time, the analysis module (212) may be called upon multiple times to create or update the recovery plans. For example, in one embodiment, the environment analysis module (212) may be activated in response to one or more specific changes to the client IT environment. Similarly, in one embodiment, the environment analysis module (212) may be activated on a periodic basis to evaluate the client IT environment, and in response to any detected changes or detected significant changes, to create or update the plans. Accordingly, the analysis module (212) maintains a current state of the client environment to support disaster recovery.

The fast response module (214) is shown in communication environmental analysis module (212). The fast response module (214) functions to institute a recovery according to the recovery protocol (234) generated by the environment analysis module (212). Specifically, the fast response module (214) instantiates the foreground recovery plan (236) in response to a disaster associated with a client IT environment. As articulated in FIG. 1, the foreground recovery plan operates a workload for selected core or critical applications associated with the client IT environment. In one embodiment, the foreground recovery plan (236) includes a containerization plan, or blueprint. At such time as a disaster is either detected or declared, the fast response module (214) functions to execute the foreground recovery plan and launch one or more containers as dictated by the plan (236). In one embodiment, the foreground recovery plan (236) includes a predefined order, which may be referred to as a container launching plan, in which to launch the containers. For example, the predefined order may be determined based on application criticality, with the most critical core application being launched first. In other words, the core applications associated with the client IT environment may be autonomously arranged in the container launching plan in descending order based on criticality. Alternatively, the container launching plan may be created manually, for example, by a user.

As shown and described herein, the recovery plans (236) and (238) are stored in the memory (206) of the DRaaS provider (202). In one embodiment, the foreground recovery plan (236), or a copy of the foreground recovery plan, is also stored local to the client (220). In the event of a disaster, the fast response module (214) accesses and executes the foreground recovery plan. Similarly, in one embodiment, activation of the foreground recovery plan (236) may be local to the DRaaS provider (202), with the containers directing or re-directing traffic from any prior addresses affected by the disaster to one or more addresses as dictated by the containers. For example, in one embodiment, the DRaaS provider (202) may be comprised of a plurality of servers at more than one location of shared resources. Accordingly, the foreground recovery plan (236) provides containerization service to support core applications of a client IT environment.

The synchronization module (216) functions to instantiate the background recovery plan (238). The synchronization module (216) is shown local to the DRaaS provider (202). The synchronization module (216) functions to re-configure or re-build a client IT environment that has been affected by the disaster. Specifically, the synchronization module (216) responds to a disaster associated with one or more virtual machines of the client IT environment and addresses the background recovery plan (238) for the client that has experienced the disaster.

As further shown herein, the synchronization module (216) is in communication with the fast response module (214) to enable coordination of switching between the environments. More specifically, at such time as the background recovery process is complete and ready to be launched, the synchronization module (216) communicates with the fast response module (214) for the switchover of the client site from the container format to the recovered virtual machine format. The conditions in which the switchover may take place may vary. For example, in one embodiment, the synchronization module (216) may institute an immediate switchover once the background recovery plan (238) is complete. In one embodiment, the synchronization module (216) may allow a predefined period of time to lapse before the switchover. Similarly, in one embodiment, the synchronization module (216) may view traffic to the client containers, and execute the switchover responsive to a decrease in client traffic, or in one embodiment, a pause or gap in client traffic, thereby facilitating the transparency of the switchover. In one embodiment, the background recovery plan (238) may include one or more switchover policies, and the synchronization module (216) may follow the switchover policies to institute the switchover from the container format to the recovered virtual machine format.

As shown and described in FIG. 2, DRaaS provider (202) is in communication with a client site to support disaster recovery. The DRaaS provider (202) may be a service provider of a cloud computing environment, or other shared pool of configurable computer resources. Files in the cloud environment may be shared among users within multiple data centers, also referred to herein as data sites. A series of mechanisms are provided within the shared pool to provide decision making controls for access to one or more records based upon associated record access and inherent characteristics of privacy. Three knowledge bases are employed with respect to consent management, including importance, sensitivity, and relevance. Analytical techniques employ the knowledge bases to assist with making access control decisions.

Figure 3:
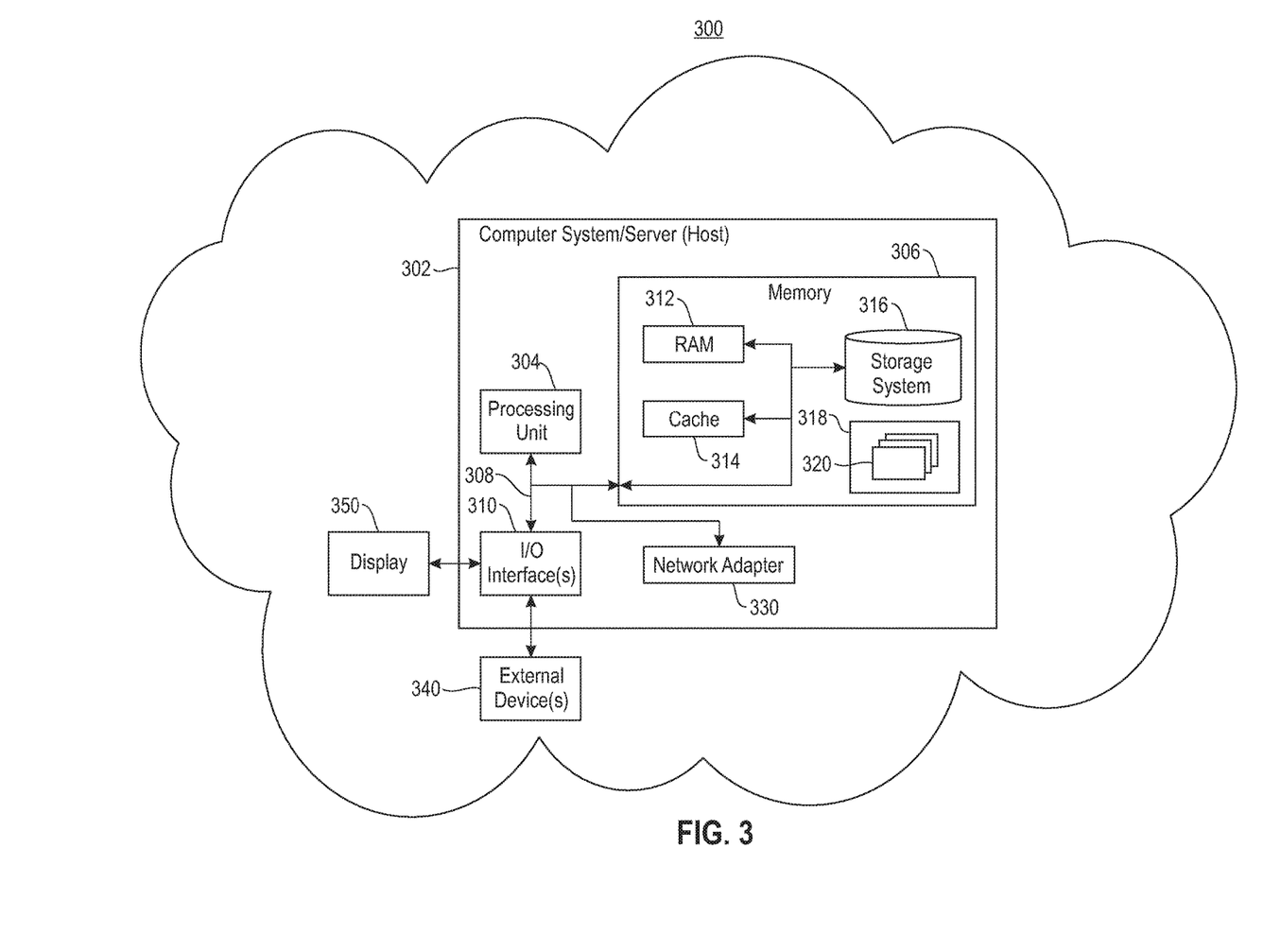
FIG. 3 depicts a schematic example of a system to implement the process of FIG. 1 and the system of FIG. 2.

With reference to FIG. 3, a block diagram (300) is provided illustrating an example of a computer system/server (302), hereinafter referred to as a host (302) of a cloud based support system, to implement the processes described above with respect to FIGS. 1-2. Host (302) is operational with numerous other general purpose or special purpose computing system environments or configurations. Examples of well-known computing systems, environments, and/or configurations that may be suitable for use with host (302) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems or devices, and the like.

Host (302) may be described in the general context of computer system-executable instructions, such as program modules, being executed by a computer system. Generally, program modules may include routines, programs, objects, components, logic, data structures, and so on that perform particular tasks or implement particular abstract data types. Host (302) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, host (302) is shown in the form of a general-purpose computing device. The components of host (302) may include, but are not limited to, one or more processors or processing units (304), a system memory (306), and a bus (308) that couples various system components including system memory (306) to processor (304). Bus (308) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (302) typically includes a variety of computer system readable media. Such media may be any available media that is accessible by host (302) and it includes both volatile and non-volatile media, removable and non-removable media.

Memory (306) can include computer system readable media in the form of volatile memory, such as random access memory (RAM) (312) and/or cache memory (314). Host (302) further includes other removable/non-removable, volatile/non-volatile computer system storage media. By way of example only, storage system (316) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (308) by one or more data media interfaces.

Program/utility (318), having a set (at least one) of program modules (320), may be stored in memory (306) by way of example, and not limitation, as well as an operating system, one or more application programs, other program modules, and program data. Each of the operating systems, one or more application programs, other program modules, and program data or some combination thereof, may include an implementation of a networking environment. Program modules (320) generally carry out the functions and/or methodologies of embodiments of disaster recovery as described herein. For example, the set of program modules (320) may include the analysis, response, and synchronization modules configured to implement the disaster recovery processes described above with reference to FIGS. 1-2, including.

Host (302) may also communicate with one or more external devices (340), such as a keyboard, a pointing device, etc.; a display (350); one or more devices that enable a user to interact with host (302); and/or any devices (e.g., network card, modem, etc.) that enable host (302) to communicate with one or more other computing devices. Such communication can occur via Input/Output (I/O) interface(s) (310). Still yet, host (302) can communicate with one or more networks such as a local area network (LAN), a general wide area network (WAN), and/or a public network (e.g., the Internet) via network adapter (330). As depicted, network adapter (330) communicates with the other components of host (302) via bus (308). In one embodiment, a plurality of nodes of a distributed file system (360) is in communication with the host (302) via the I/O interface (310) or via the network adapter (330). It should be understood that although not shown, other hardware and/or software components could be used in conjunction with host (302). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (306), including RAM (312), cache (314), and storage system (316), such as a removable storage drive and a hard disk installed in a hard disk drive.

Computer programs (also called computer control logic) are stored in memory (306). Computer programs may also be received via a communication interface, such as network adapter (330). Such computer programs, when run, enable the computer system to perform the features of the present invention as discussed herein. In particular, the computer programs, when run, enable the processing unit (304) to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, host (302) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
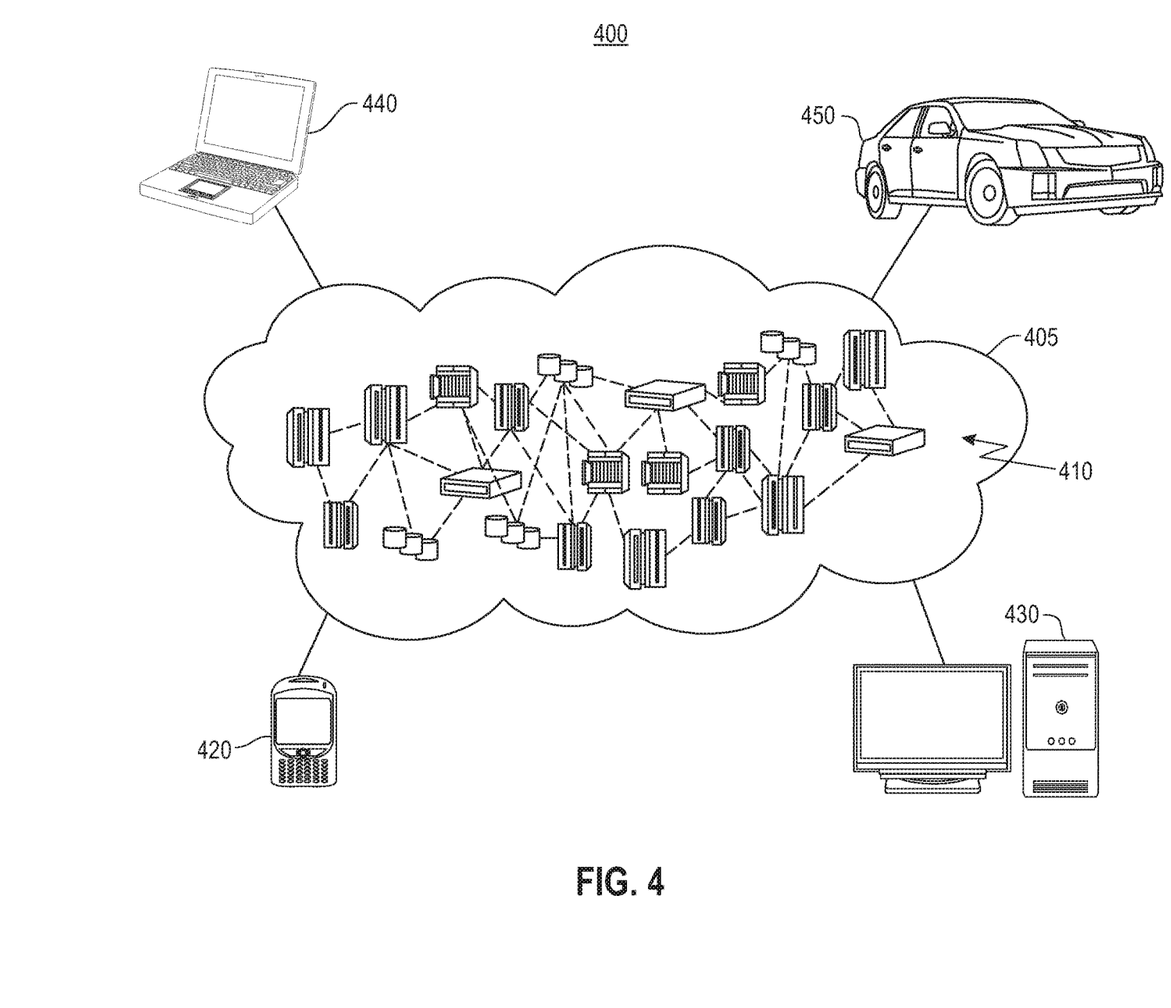
FIG. 4 depicts a block diagram illustrative of a cloud computing environment.

Referring now to FIG. 4, an illustrative cloud computing network (400). As shown, cloud computing network (400) includes a cloud computing environment (405) having one or more cloud computing nodes (410) with which local computing devices used by cloud consumers may communicate. Examples of these local computing devices include, but are not limited to, personal digital assistant (PDA) or cellular telephone (420), desktop computer (430), laptop computer (440), and/or automobile computer system (450). Individual nodes within nodes (410) may further communicate with one another. They may be grouped (not shown) physically or virtually, in one or more networks, such as Private, Community, Public, or Hybrid clouds as described hereinabove, or a combination thereof. This allows cloud computing environment (400) to offer infrastructure, platforms and/or software as services for which a cloud consumer does not need to maintain resources on a local computing device. It is understood that the types of computing devices (420)-(450) shown in FIG. 4 are intended to be illustrative only and that the cloud computing environment (405) can communicate with any type of computerized device over any type of network and/or network addressable connection (e.g., using a web browser).

Figure 5:
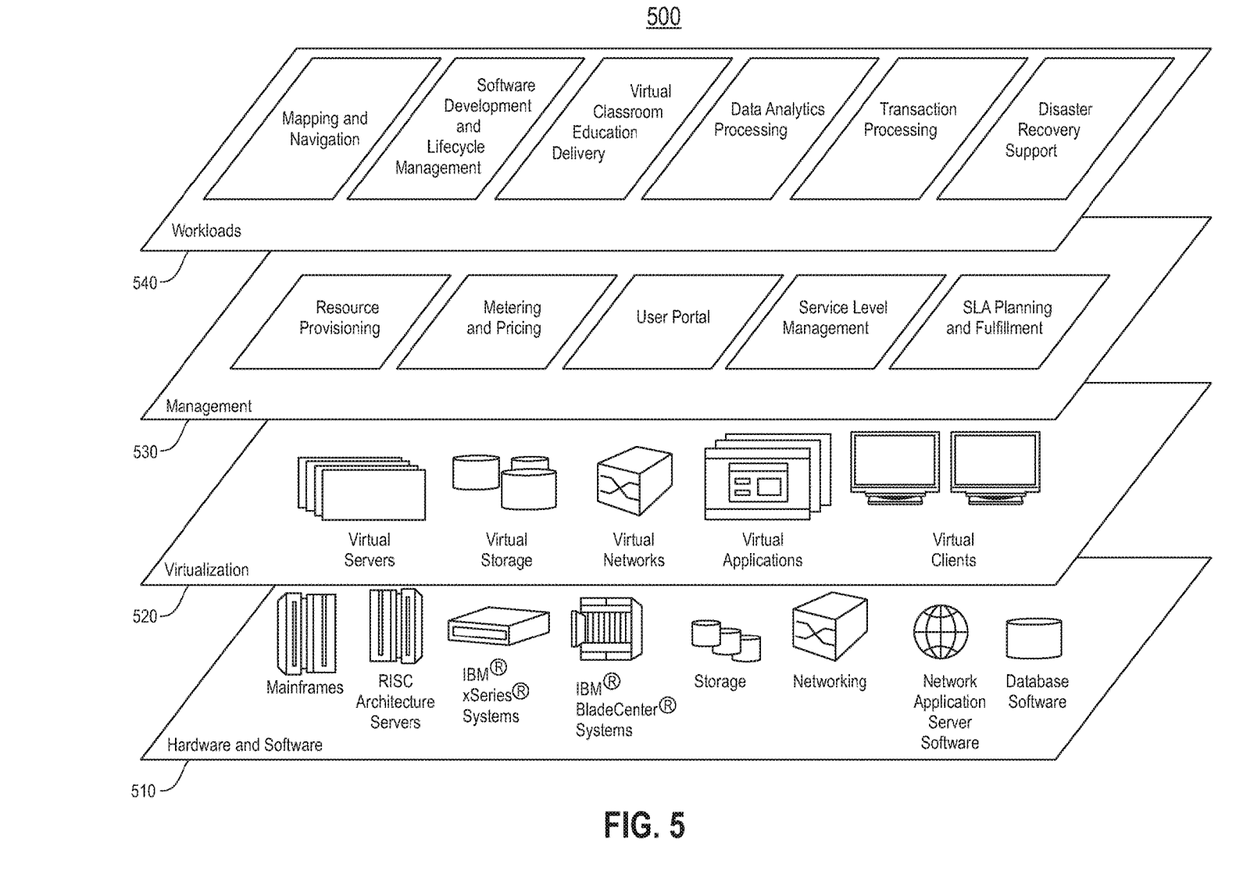
FIG. 5 depicts a block diagram illustrating a set of functional abstraction model layers provided by the cloud computing environment.

Referring now to FIG. 5, a set of functional abstraction layers provided by the cloud computing network of FIG. 4 is shown. It should be understood in advance that the components, layers, and functions shown in FIG. 5 are intended to be illustrative only, and the embodiments are not limited thereto. As depicted, the following layers and corresponding functions are provided: hardware and software layer (510), virtualization layer (520), management layer (530), and workload layer (540). The hardware and software layer (510) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (520) provides an abstraction layer from which the following examples of virtual entities may be provided: virtual servers; virtual storage; virtual networks, including virtual private networks; virtual applications and operating systems; and virtual clients.

In one example, management layer (530) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (540) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and disaster recovery support within the cloud computing environment.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

The server described above in FIG. 2 has been labeled with tools in the form of modules, including the analysis module, the response module, and the synchronization module. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of the disaster recovery provides temporary client support by launching a container to operate a workload of core client applications of a client IT environment until such time as the virtual machine format and/or infrastructure of the client IT environment is operational.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
   receiving a replication of an information technology environment;
   identifying one or more core applications;
   generating a recovery plan for the environment, the recovery plan comprising a first process and a second process, wherein the first process of the recovery plan is generated based on the identified one or more core applications; and
   in response to the service provider receiving a disaster recovery request associated with the environment, the service provider executing a disaster recovery protocol, including:
      simultaneously executing the first process and the second process, wherein the first process is configured to operate a workload associated with core applications of the environment, and wherein the second process is a background process configured to create a replica of the environment; and after completion of the replica, migrating the workload to the replica.

2. The method of claim 1, wherein the recovery plan further comprises a set of recovery policies, and wherein the workload is migrated to the replica based on the set of recovery policies.

3. The method of claim 1, wherein executing the first process comprises creating a containerization environment, including launching one or more containers corresponding to each core application.

4. The method of claim 3, wherein the recovery plan includes a containerization blueprint, and wherein each container is launched based on the containerization blueprint.

5. The method of claim 3, wherein the containers are launched in a predefined order, and wherein the predefined order is determined by a process selected from the group consisting of: manual and automatic.

6. The method of claim 5, wherein the automatic process comprises arranging the core applications in descending order based on criticality.

7. A computer program product comprising a computer readable storage device having program code embodied therewith, the program code executable by a processing unit to:

receive a replication of an information technology environment;

identify one or more core applications;

generate a recovery plan for the environment, the recovery plan comprising a first process and a second process, wherein the first process of the recovery plan is generated based on the one or more identified core applications; and in response to receiving a disaster recovery request associated with the environment, execute a disaster recovery protocol, including program code to:

simultaneously execute the first process and the second process, wherein the first process is configured to operate a workload, and wherein the second process is a background process configured to create a replica of the environment; and after completion of the replica, migrate the workload from the recovery process to the completed replica.

8. The computer program product of claim 7, wherein the recovery plan further comprises a set of recovery policies, and wherein the workload is migrated to the replica based on the set of recovery policies.

9. The computer program product of claim 7, wherein execution of the recovery process comprises program code to create a containerization environment, including program code to launch one or more containers corresponding to each core application.

10. The computer program product of claim 9, wherein the recovery plan includes a containerization blueprint, and wherein each container is launched based on the containerization blueprint.

11. The computer program product of claim 9, wherein the containers are launched in a predefined order, and wherein the predefined order is determined by a process selected from the group consisting of: manual and automatic.

12. The computer program product of claim 11, wherein the automatic process comprises program code to arrange the core applications in descending order.

13. A system comprising:

a processing unit operatively coupled to memory; and one or more tools in communication with the processing unit, the tools to:

receive and store a replication of an information technology environment;

identify one or more core applications;

generate a recovery plan for the received and stored environment, the recovery plan comprising a first process and a second process, wherein the first process is generated based on the identified one or more core applications; and execute a disaster recovery protocol in response to receipt of a disaster recovery request associated with the stored environment, including the tools to:

simultaneously execute the first process and the second process, wherein the first process is configured to operate a workload as a foreground process, and the second process is a background process configured to create a replica of the environment; and after completion of the replica, migrate the workload to the completed replica.

14. The system of claim 13, wherein the recovery plan further comprises a set of recovery policies, and wherein the workload is migrated to the replica based on the set of recovery policies.

15. The system of claim 13, wherein execution of the recovery process comprises the tools to create a containerization environment, including the tools to launch one or more containers corresponding to each core application.

16. The system of claim 13, wherein the recovery plan includes a containerization blueprint, and wherein each container is launched based on the containerization blueprint.

17. The system of claim 16, wherein the containers are launched in a predefined order, wherein the predefined order is determined by a process selected from the group consisting of: manual and automatic, and wherein the automatic process comprises program code to arrange the core applications in descending order.

* * * * *